United States Patent
Bivens et al.

(10) Patent No.: US 7,447,226 B2
(45) Date of Patent: Nov. 4, 2008

(54) METHODS AND APPARATUS FOR CONTINUOUS CONNECTIVITY BETWEEN MOBILE DEVICE AND NETWORK USING DYNAMIC CONNECTION SPREADING

(75) Inventors: John Alan Bivens, Ossining, NY (US); John Sidney Davis, II, New York, NY (US); Gelonia L. Dent, Larchmont, NY (US); Daby Mousse Sow, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1194 days.

(21) Appl. No.: 10/699,235

(22) Filed: Oct. 31, 2003

(65) Prior Publication Data

US 2005/0094666 A1 May 5, 2005

(51) Int. Cl.
*H04L 12/54* (2006.01)
(52) U.S. Cl. .................. 370/429; 370/428; 370/465; 370/474
(58) Field of Classification Search ................ 370/312, 370/315, 328, 331, 338, 352, 353, 390, 411, 370/465, 473, 428, 429, 474; 455/432.1, 455/436–444
See application file for complete search history.

(56) References Cited

U.S. PATENT DOCUMENTS 6,285,878 B1 * 9/2001 Lai ............................ 455/431
6,308,045 B1 * 10/2001 Wright et al. ............... 455/431
6,332,077 B1 * 12/2001 Wu et al. .................. 455/432.1
6,529,706 B1 * 3/2003 Mitchell .................... 455/12.1
6,636,721 B2 * 10/2003 Threadgill et al. ......... 455/12.1
6,760,778 B1 * 7/2004 Nelson et al. ............... 709/246

FOREIGN PATENT DOCUMENTS

WO     WO 2054804 A1 * 7/2002

OTHER PUBLICATIONS

Chen, Abel et al., "Performance Evaluation of ARQ Operations with OBP and Inter-satellite Links: Delay Performance," Vehicular Technology Conference, VTC 2001. Oct. 2001. vol. 4, pp. 2346-2350.*
Wittig, M. et al., "OBP for Private Networks and Residential Users," Tenth International Conference on Digital Satellite Communications, May 1995. vol. 2, pp. 653-660.*

* cited by examiner

*Primary Examiner*—Chi H. Pham
*Assistant Examiner*—Donald L Mills
(74) *Attorney, Agent, or Firm*—Douglas W. Cameron; Ryan, Mason & Lewis, LLP

(57) ABSTRACT

The invention provides methods and apparatus for establishing a connection between a mobile client and an external computer network such that the client computer network connection provides the illusion of seamless connectivity. In one aspect of the invention data is processed in a wireless communication network and is received from a access point at a gateway to an external computer network. Access points are disposed in the vicinity of the path of the mobile client. In another aspect of the invention data is processed in a wireless communication network and is received at an onboard proxy from an access point. The data is then transmitted to a mobile client.

1 Claim, 13 Drawing Sheets

METHODS AND APPARATUS FOR CONTINUOUS CONNECTIVITY BETWEEN MOBILE DEVICE AND NETWORK USING DYNAMIC CONNECTION SPREADING

FIELD OF THE INVENTION

The present invention is related to wireless data processing and, more particularly, to wireless data processing supporting continuous connectivity between a mobile client and a network.

BACKGROUND OF THE INVENTION

The ability to access a computer network at anytime, and from anywhere, has become a goal of the communications industry. Progress toward accomplishing this goal has been possible due to the widespread availability of laptops, cell phones, pagers and other communication devices, as well as the popularity of the Internet. While the mobility of these devices frees the user from being tethered to a single location and allows the devices to be leveraged where they are needed, their full potential is only reached through access to other computers. This results in the need for facilities for high speed connections between mobile devices and a network so that significant amounts of data can be transferred while the mobile device travels a significant distance. However, moderate to high speed Internet connectivity for a mobile device is a difficult proposition. The challenge is exacerbated when the mobile device is transported over long distances during a single communication session.

Existing mobile computing systems include cellular systems, satellite systems, and wireless data networks. Cellular systems and wireless data networks provide connections for clients through a distribution of access points. These access points are constructed having a goal of providing continuous connectivity for the client, however, the ability to properly distribute access points to meet this goal is always limited. The inability to provide the needed distribution of access points results in geographic dead zones in which connections between the client and the network are not possible. A client traveling a significant distance during a single communication session may experience several geographic dead zones which interrupt the communication. Even carefully constructed wireless infrastructures can suffer from temporary or permanent outside interference, which result in dropped connections.

While dead zones are less of an issue with satellite systems, such systems are susceptible to interference due to rain, snow and other environmental conditions. Furthermore, satellite systems are very expensive to operate resulting in inflexible designs.

In order for customers to work seamlessly in a mobile environment, the challenges of the existing systems must be overcome. Thus, a need exists for a data transmission system that provides continuous connections between mobile clients and a network.

SUMMARY OF THE INVENTION

The present invention provides techniques for wireless data processing and, more particularly, for wireless data processing supporting continuous connectivity between a mobile client and a network.

For example, in one aspect of the invention, a method for processing data in a wireless communication network comprises the following steps. Portions of a message are received at a computing device from a plurality of access points. The access points are in range of a mobile client in the wireless communication network. The received portions are then merged into a single portion in the computing device.

The computing device may be a gateway to an external computer network. In another aspect of the invention, the computing device may be an onboard proxy in a mobile vehicle in the wireless communication network.

Advantageously, the networked communication from a mobile client to a network of computers, via transmission through a dynamic set of intelligent access points, creates the illusion that the client maintains a continuous connection to the network of computers over long distances.

Another advantageous aspect of the invention is that the methodology may be particularly useful in public transportation systems in which a client aboard a moving vehicle needs to access computer resources off the vehicle via continuous noninterrupted communication. Further, the success of continuous communication of the present methodology is not susceptible to interference due to environmental conditions, nor are its operating costs as expensive as a satellite system.

These and other objects, features, and advantages will become apparent from the following detailed description of illustrative embodiments thereof, which is to be read in connection with the accompanying drawings.

DETAILED DESCRIPTION OF PREFERRED EMBODIMENTS

Figure 1:
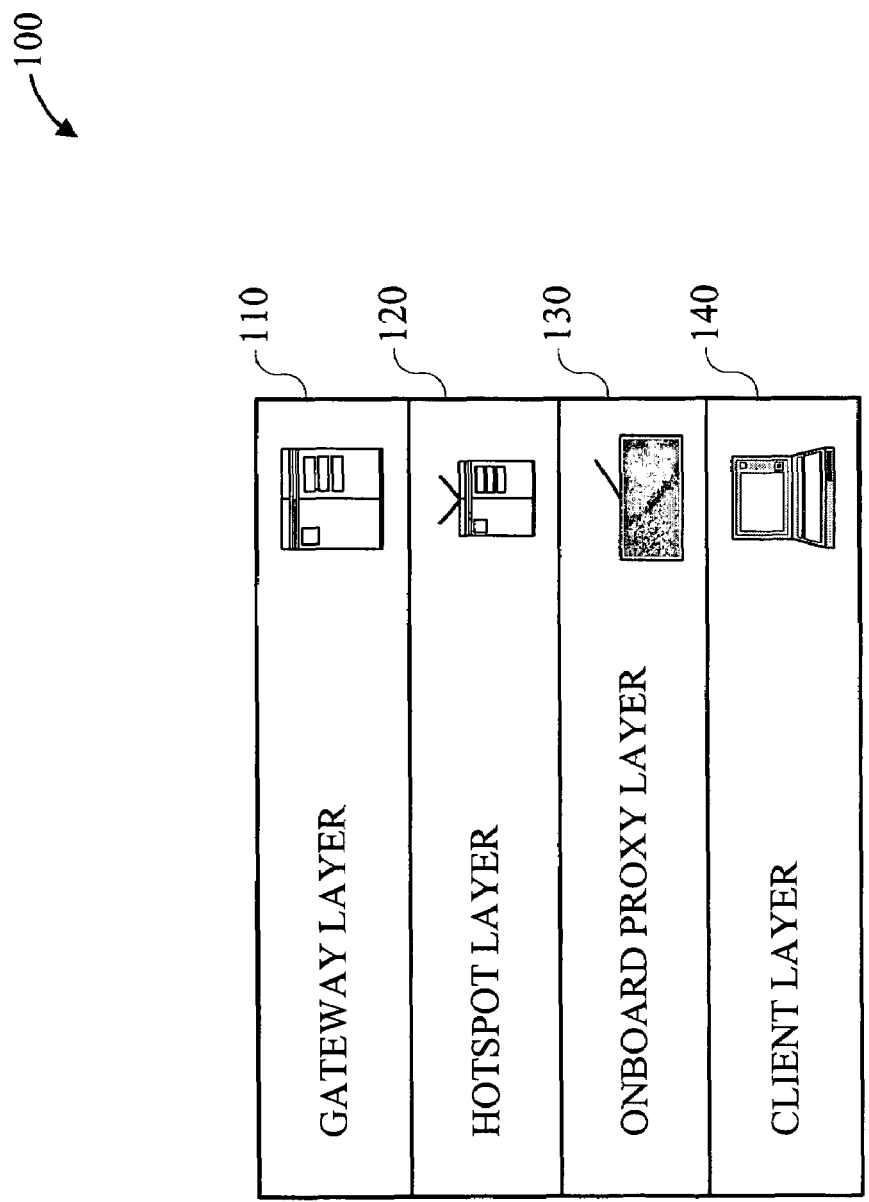
FIG. 1 is a block diagram illustrating the layers of system interaction, according to an embodiment of the present invention.

The following description will illustrate principles of the invention using an exemplary data processing system architecture. It should be understood, however, that the invention is not limited to use with any particular system architecture. The invention is instead more generally applicable to any data processing system in which it is desirable to perform efficient and effective query processing operations.

As will be illustrated in detail below, the present invention introduces techniques for wireless data processing with continuous connectivity between a mobile client and a network.

The term "chunk," as used herein, is intended to describe one component of a sequence of components decomposed from a communication message. A chunk may be further decomposed to produce two or more chunks. Two or more chunks from the same message that are sequentially adjacent may be combined to form a larger chunk. The set of chunks associated with a given message can be reassembled into the communication message. The term "reassembly," as used herein, is intended to describe the process of composing a sequence of chunks into a communication message.

The term "gateway," as used herein, is intended to describe a computing entity that interfaces the connection spreading system with an external computing network. An example of an external computing network is the public Internet. Each gateway is associated with a domain and can transmit data to the external computing network as well as receive data from the external computing network. The term "hotspot," as used herein, is intended to describe an intelligent access point that interfaces an onboard proxy and a gateway. A hotspot transmits data to and from the moving vehicle based in part on calculations of the vehicle's velocity. In addition, the hotspot buffers data as is necessary.

The term "OnBoard Proxy (OBP)," as used herein, is intended to describe a bi-directional buffering agent that executes onboard the moving vehicle. The onboard proxy resides on the moving vehicle and serves as the interface between the hotspot layer and the client communication device. An onboard proxy transmits data to and from a set of hotspots based in part on calculations of the moving vehicle's velocity and the client's data rate. The term "Master OnBoard Proxy (MOBP)," as used herein, is intended to describe an OBP that acts as the authoritative entry in the OBP layer of a vehicle. The MOBP is responsible for administering addresses, reassembly of upstream/downstream data, and locating which OBP is appropriate for sending data to hotspots and clients.

The term "client," as used herein, is intended to describe a computing device that resides onboard a moving vehicle and can exchange programmatic data with a computer network. The client layer comprises client communication devices, such as a laptop computers. Clients transmit data to an onboard proxy and receive data from an onboard proxy. The term "connection spreading system," as used herein, is intended to describe a system that contains a gateway layer, a hotspot layer, an onboard proxy layer and a client layer, as specified in the present disclosure.

The term "downlink transmission," as used herein, is intended to describe communication whose destination is a client onboard a vehicle. The term "uplink transmission," as used herein, is intended to describe communication whose source is a client onboard a vehicle.

The methodology of the present invention involves the use of a local bi-directional buffering agent, referred to as an onboard proxy, that stores and analyzes attributes of the connection as well as attributes of the client. The onboard proxy establishes communication with a network of computers on behalf of the client via a dynamic set of intelligent access points, referred to as hotspots. The hotspots then transmit data to a set of one or more gateways that serve as interfaces to the network of computers. The onboard proxy remains within the vicinity of the client resulting in similar mobility. As the onboard proxy and client move, the onboard proxy predicts the client's trajectory and shields the client from knowledge of the changing hotspots and gateways. The client is unaware of the connection status even as the client enters environments with no available connections. This overall method is referred to as "connection spreading."

The present invention provides apparatus, methods and articles of manufacture that permit clients to maintain the illusion of a seamless high speed connection to a computing network while traveling onboard a moving vehicle, where the computing network is not onboard the moving vehicle. Communication devices that will have the illusion of seamless high speed connection to a computing network can include laptop computers or PDAs. A computing network to which communication devices onboard a moving vehicle will have the illusion of a seamless high speed connection may be a computing network, such as the public Internet or a proprietary network using non TCP/IP-based protocols. A moving vehicle that offers a communication system which provides the illusion of a seamless high speed connection to an off-board computing network may be a railroad train used for mass transit purposes.

The methodology of the present invention is particularly useful in public transportation systems in which a client aboard a moving vehicle is interested in accessing computer resources off of the vehicle. A client initiates a communication session by establishing a wireless or wired link to the vehicle's onboard proxy. The onboard proxy registers the client by indicating to the rest of the connection spreading system that the client is associated with the particular onboard proxy. As the vehicle moves, a prediction is made of the vehicle's trajectory. Such trajectory prediction determines which hotspots the vehicle will come in close proximity of during a client's session. As the client transmits data to the Internet the data is buffered by the vehicle's onboard proxy. When the vehicle comes close to a hotspot, the data is transmitted to the hotspot and the hotspot forwards the data to the client's intended destination.

In transmitting data to the client from a computing resource off of the vehicle, the data is routed to the appropriate hotspot based on the predicted trajectory of the associated onboard proxy. Once the onboard proxy comes within close proximity of the designated hotspot, the data is communicated to the client through the onboard proxy.

Referring initially to FIG. 1, block diagram illustrates the layers of system interaction, according to an embodiment of the present invention. A mobile connection spreading system 100 is shown in which a gateway layer 110 communicates to a hotspot layer 120. Hotspot layer 120 communicates to gateway layer 110 and an onboard proxy layer 130. Onboard proxy layer 130 communicates to hotspot layer 120 and client layer 140. Client layer 140 communicates to onboard proxy layer 130.

Figure 2:
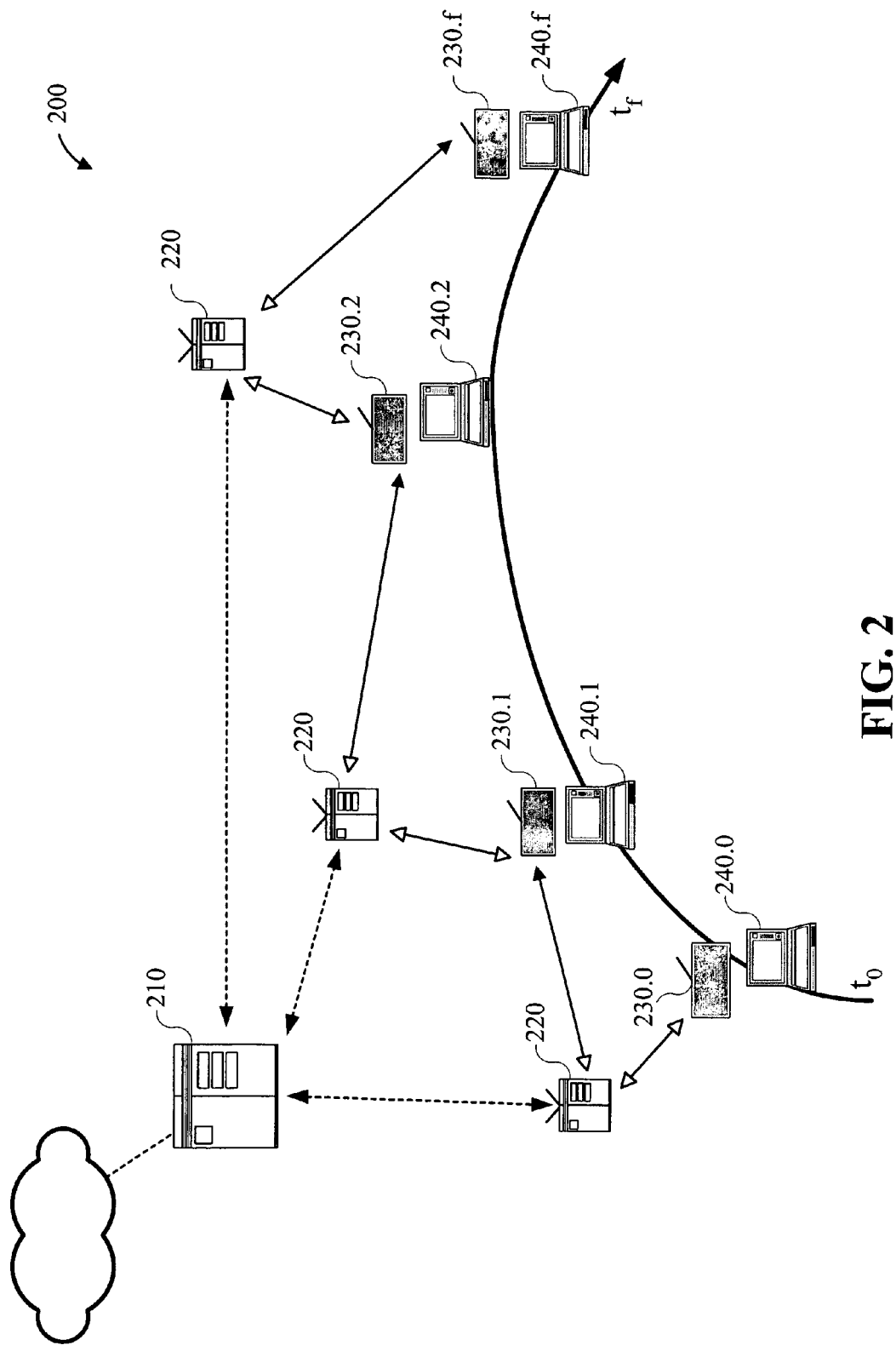
FIG. 2 is a diagram illustrating a connection spreading system, according to an embodiment of the present invention.

Referring now to FIG. 2, a diagram illustrates the connection spreading system, according to an embodiment of the present invention. A bi-directional communication relationship exists between the four layers of the system. The trajectory of a client 240 is known a priori and instances of the position of the client along the trajectory, 240.0, 240.1, 240.2, 240.f, are shown over a time interval, $[t_0, t_f]$. Client 240 connects to an onboard proxy 230 to send or receive a data transmission. The trajectory of onboard proxy 230 is also known a priori and instances of the position of the onboard proxy along the trajectory, 230.0, 230.1, 230.2, 230.f, are shown over a time interval. Next, onboard proxy 230 transmits the data to, or receives data from, a hotspot 220, which transmits the data to, or receives data from, a gateway 210. Whenever necessary, communications may be spread within each layer, e.g., hotspot to hotspot, proxy to proxy, etc. These scenarios are described in further detail by subsequent methodologies. Clients attempting to connect to the mobile connection spreading system must first participate in an addressing mechanism to obtain a reachable address for sending and receiving data.

Figure 3:
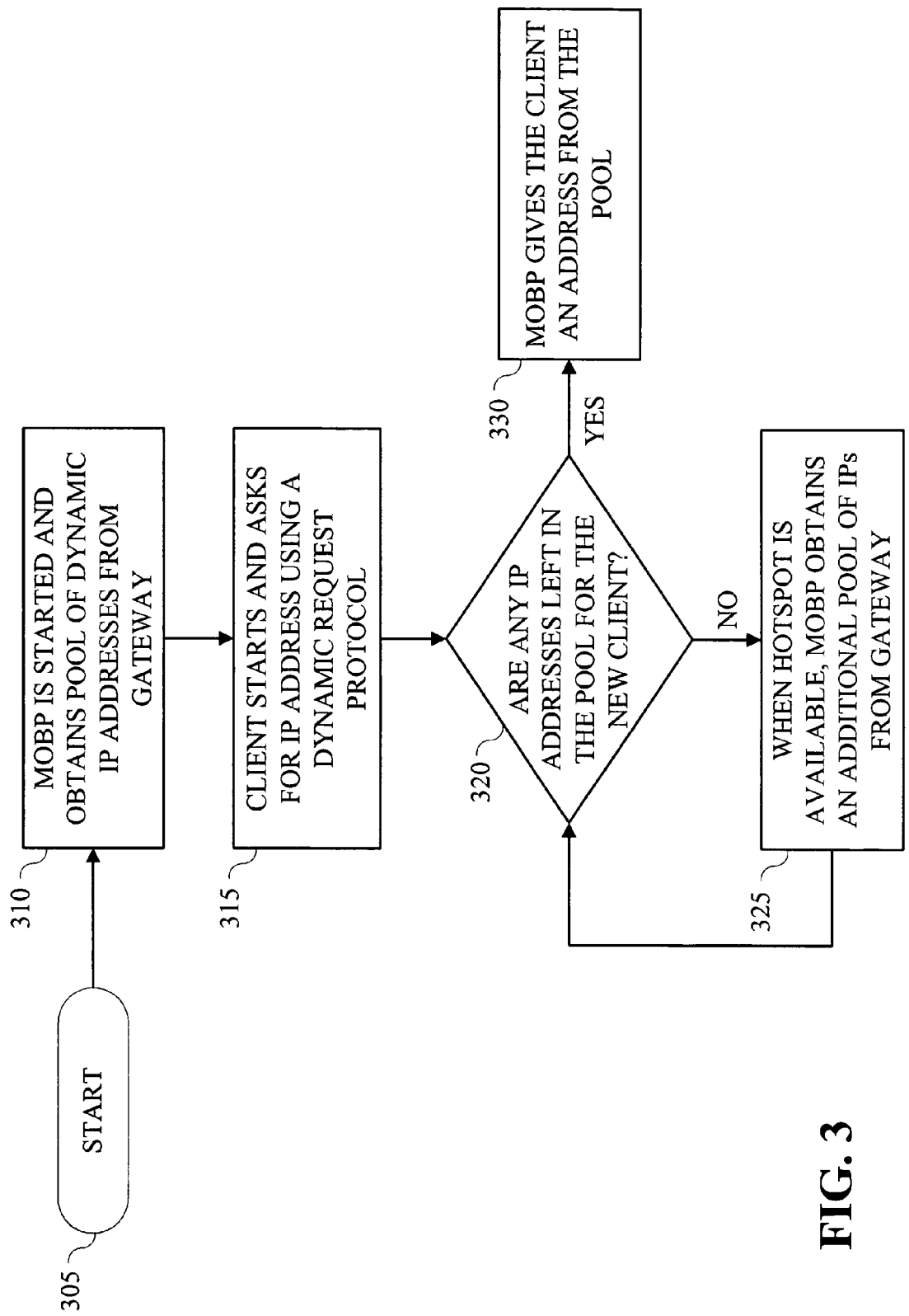
FIG. 3 is a flow diagram illustrating a dynamic address relaying methodology, according to an embodiment of the present invention.

Referring now to FIG. 3, a flow diagram illustrates a dynamic address relaying methodology, according to an embodiment of the present invention. The methodology begins at step 305. The Master Onboard Proxy (MOBP) of the mobile connection spreading system acts as a relay for the addressing mechanism. In step 310, the MOBP is started and the MOBP requests a pool of IP addresses from a gateway for clients needing addresses. When a client requests an IP address in step 315 using a dynamic request protocol, the MOBP determines if any addresses remain in the pool to be relayed to the client in step 320. If no IP addresses remain in the pool, an additional pool of IP addresses is requested from the gateway when a hotspot is in range in step 325. The methodology then returns to step 320 to determine if an address remains in the pool for relaying to a client. If an IP address is available in the existing pool, the available address is relayed to the client in step 330, terminating the methodology. Once clients have obtained a reachable address and are connected to the mobile connection spreading system, the client may begin sending and receiving data.

Figure 4:
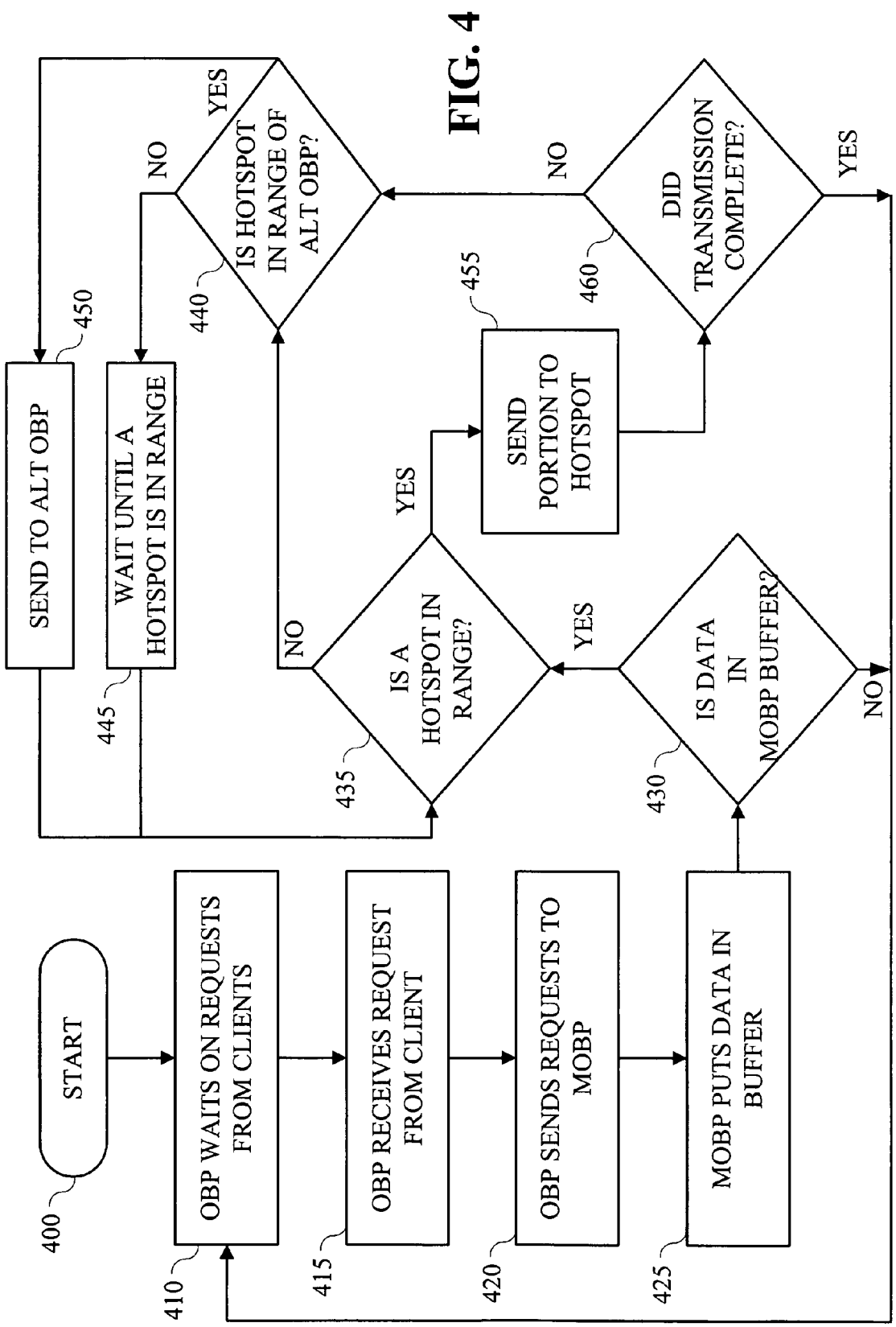
FIG. 4 is a flow diagram illustrating an upstream transmission methodology from client to onboard proxy, according to an embodiment of the present invention.

Referring now to FIG. 4, a flow diagram illustrates an upstream transmission methodology from a client through an onboard proxy to a hotspot, according to an embodiment of the present invention. This may be considered a detailed description of the transmission from client 240, through onboard proxy 230, to hotspot 220 of FIG. 2. Upstream communication proceeds from the client, through onboard proxies, to the closest hotspot. The methodology begins at step 400. The onboard proxy awaits requests from clients in step 410. Once a request is received in step 415, the request is sent to the MOBP for collection and aggregation in step 420. The data of this request is placed in a buffer in the MOBP in step 425. The methodology then determines whether data is in the buffer in step 430. If there is no data in the buffer, the methodology returns to step 410 to await a request. If there is data in the buffer, it is determined whether a hotspot is in range of the MOBP in step 435. The MOBP will always try to empty the buffer and send the data through the closest hotspot. If a hotspot is in range, the MOBP sends at least a chunk of the data to the hotspot in step 455.

It is then determined whether the entire request was transmitted in step 460. If the transmission was complete, the methodology returns to step 410 to await the next request. If the transmission was not complete or if there was no hotspot in range of the MOBP, the other OBPs are evaluated to determine if they are in range of any hotspots in step 440. If an alternate OBP is in range of a hotspot, the request data remaining at the MOBP is sent to the alternate OBP in step 450. The methodology then returns to step 435 to determine if the hotspot is in range and to send at least a chunk of the data to the alternate hotspot in step 455. If the alternate OBP is not in range of a hotspot, the data is held until a hotspot in range is found in step 445.

Figure 5:
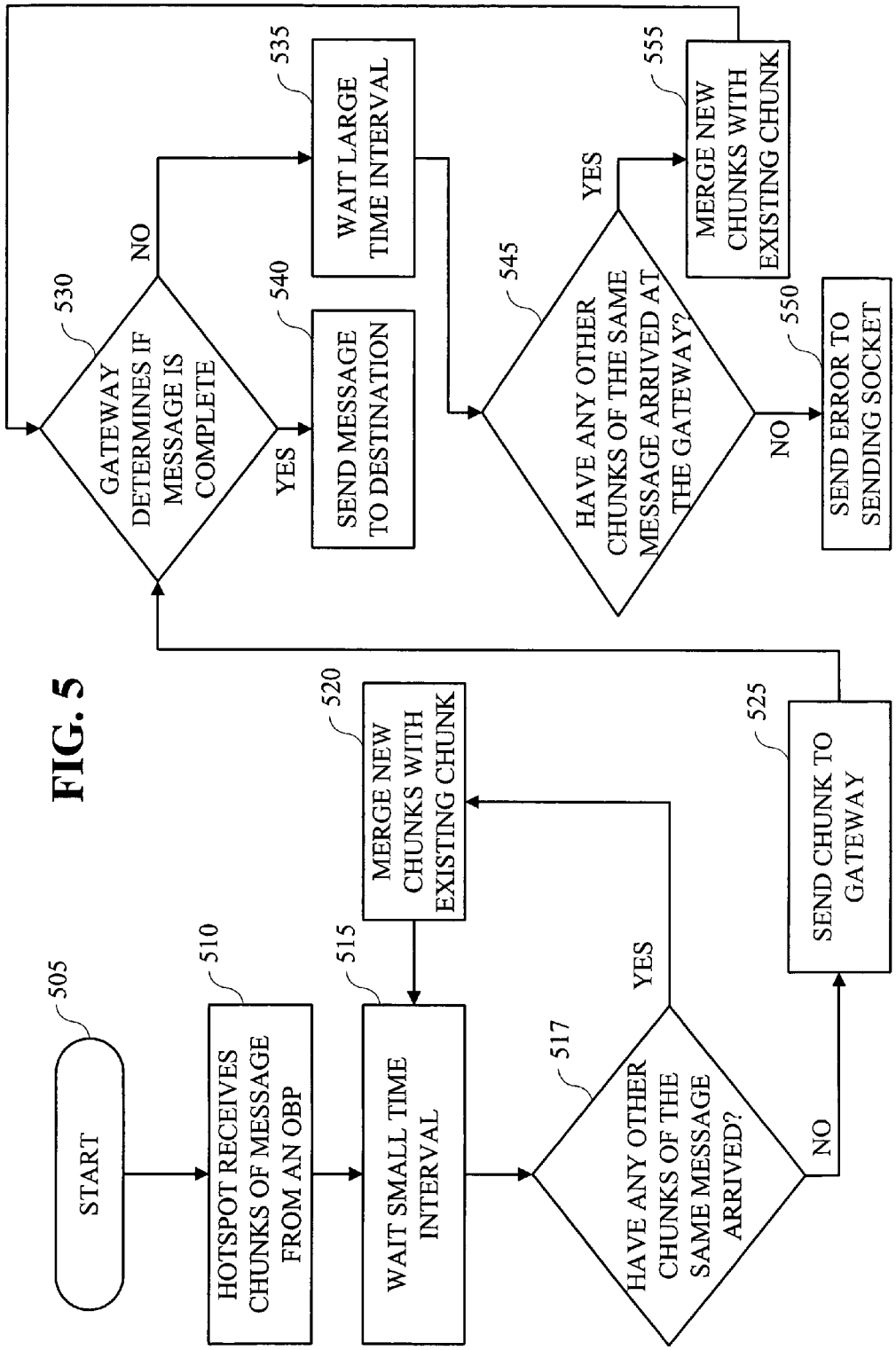
FIG. 5 is a flow diagram illustrating a communication and data reassembly methodology between the access point and gateway layers, according to an embodiment of the present invention.

Referring now to FIG. 5, a flow diagram illustrates communication and data reassembly methodology between the hotspot and gateway layers, according to an embodiment of the present invention. This may be considered a detailed description of the transmission from hotspot 220 to gateway 210 in FIG. 2. The methodology begins at step 505. The hotspot receives a chunk of a message from an onboard proxy in step 510. After receiving the chunk the hotspot waits a short time interval in step 515. The hotspot then determines if any other chunks of the same message have arrived in step 517. If other chunks have arrived, the hotspot merges the newly arrived chunks with the original chunk in step 520 and the methodology returns to step 515 to await additional chunks. If no other chunks arrived within the small time interval, the hotspot sends the chunk to the gateway in step 525. The gateway determines if the message is complete in step 530. If the message is complete, the gateway sends the message to its destination on the computing network in step 540. If the message is not complete, the gateway waits a long time interval for additional chunks in step 535. After waiting, the gateway then determines if any other chunks of the same message have arrived at the gateway in step 545. If additional chunks have arrived, the gateway merges newly arrived chunks with the original chunk in step 555 and the methodology returns to step 530 to determine if the message is complete. If no additional chunks have arrived, the gateway sends an error to the sending socket from which the chunks were initially received in step 550, terminating the methodology.

Figure 6:
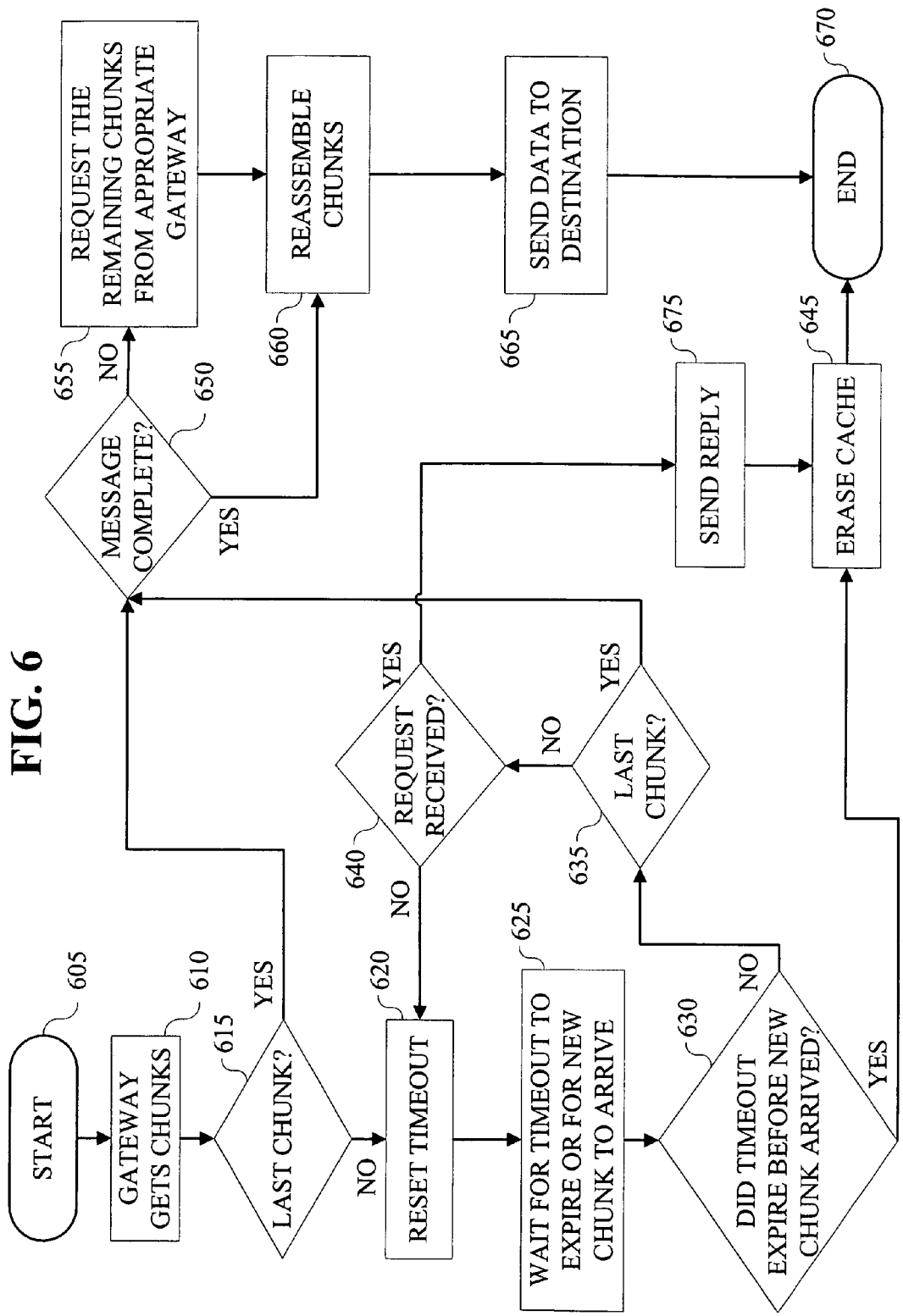
FIG. 6 is a flow diagram illustrating an upstream reassembly methodology between gateway peers, according to an embodiment of the present invention.

Referring now to FIG. 6, a flow diagram illustrates an upstream data reassembly methodology between gateway peers, according to an embodiment of the present invention. The methodology begins at step 605. A gateway receives a chunk of data from the hotspot layer, to be delivered to the network in step 610. The gateway then determines if this chunk is the last chunk of the corresponding session in step 615. If chunk found is the last chunk, the methodology determines if the entire message has been received in step 650. If the entire message has been received, the methodology reassembles the chunks in step 660 and sends the data to its destination on the external computer network in step 665 before terminating the methodology in step 670. If the entire message has not been received in step 650, the gateway is then aware that the client conducted parts of the session outside of the domain of the gateway. Hence, the gateway requests chunks that it does not have from other gateways in step 655 before reassembling the chunks in step 660, and sending the data to its destination on the network in step 665.

If, at step 615, the gateway determines that the last chunk has not yet been received, the methodology resets the value of a timeout in step 620. The methodology then waits for the timeout to expire or for a new chunk to arrive in step 625. It is then determined whether the timeout expired before a new chunk arrived in step 630. If the timeout expired before the new chunk arrived, the methodology assumes that the sender is not on the network anymore and erases the gateway cache of chunks in step 645 before terminating the methodology in step 670. If a new chunk arrived before the timeout expired, the gateway then determines if this newly received chunk is the last chunk of data in step 635. If the gateway has received the last chunk, the methodology continues at step 650. If the gateway has not received the last chunk, the gateway determines if the gateway has received a request from another gateway for the chunks in its cache that are related to the current session in step 640. If the gateway did receive such a request, the gateway replies to the request in step 675, and erases its cache in step 645, before terminating the methodology in step 670. If the gateway did not receive such a request, the methodology returns to step 620 to reset the timeout and await a new chunk in step 625.

Figure 7:
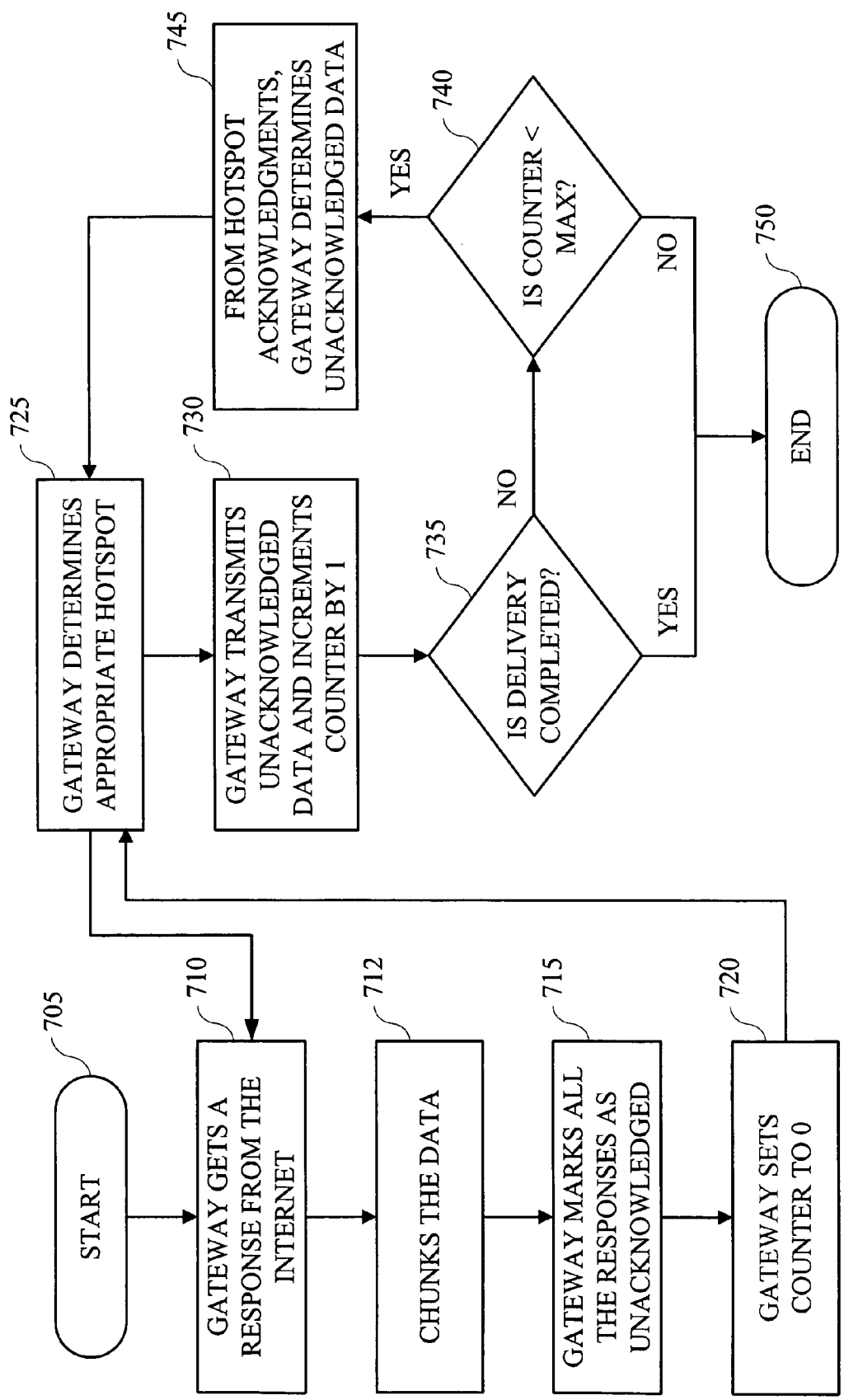
FIG. 7 is a flow diagram illustrating a downstream communication and recovery methodology between gateway and access point layers, according to an embodiment of the present invention.

Referring now to FIG. 7, a flow diagram illustrates a downstream communication and recovery methodology between gateway and hotspot layers, according to an embodiment of the present invention. This may be considered a detailed description of the transmission of data from gateway 210 to hotspot 220 in FIG. 2. Illustrated is a scenario where the gateway has caching capabilities and temporarily stores responses for clients in anticipation of the need for retransmission due to client mobility. The methodology begins at step 705. When the gateway receives data of a response from the external computing network that is to be delivered to a client in step 710, the gateway breaks the response into chunks in step 712 and marks chunks as unacknowledged in step 715. The methodology then sets a counter to 0 in step 720, and finds an appropriate hotspot to deliver the information in step 725. The gateway then attempts to transmit unacknowledged chunks and increments the counter by one in step 730. The methodology then determines whether the delivery was completed in step 735. If the gateway manages to transmit the unacknowledged chunks, the methodology terminates at step 750. If all the unacknowledged chunks were not transmitted, it is determined whether the value of the counter is less than an arbitrary value called MAX in step 740. This value can be set by an external administrator. If the value of the counter is less than MAX, then unacknowledged chunks are recomputed in step 745. Chunks successfully sent are acknowledged by the hotspot. The methodology returns to step 725 to find an appropriate hotspot and the methodology repeats. If, at step 740, the value of the counter is greater or equal to MAX, the methodology terminates at step 750.

Figure 8:
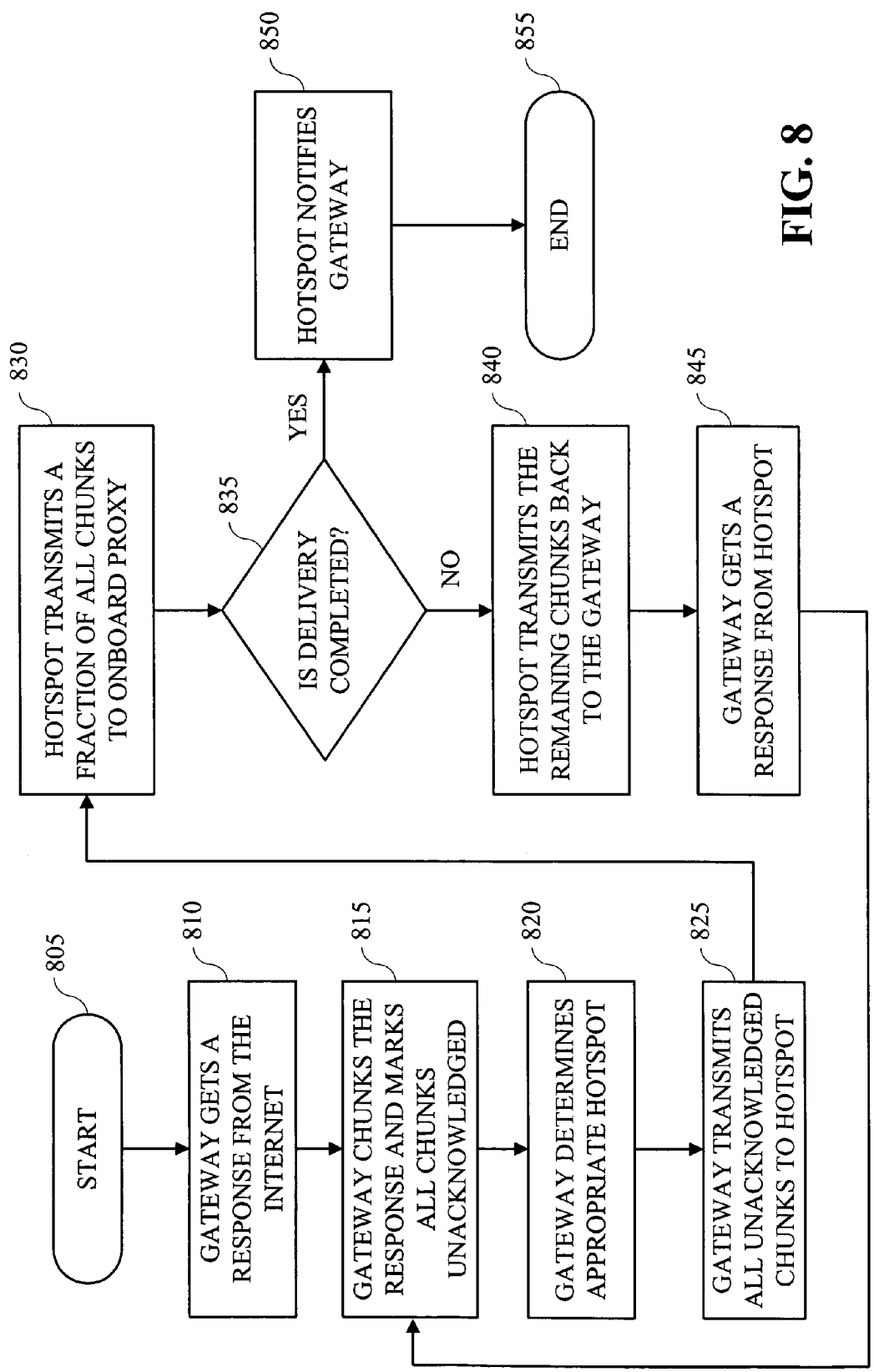
FIG. 8 is a flow diagram illustrating downstream transmission and recovery methodology from the access point, according to an embodiment of the present invention.

Referring now to FIG. 8, a flow diagram illustrates downstream transmission and recovery methodology from the hotspot layer, according to an embodiment of the present invention. This may also be considered a detailed description of the transmission of data from gateway 210 to hotspot 220 in FIG. 2. In this scenario, the system does not rely on the caching capabilities of the gateway layer to temporarily store responses for clients. The methodology begins at step 805. When a gateway gets a response for a client from the external computing network in step 810, the gateway breaks the response into chunks and marks the chunks as unacknowledged in step 815. The gateway then determines the appropriate hotspot in step 820 before transmitting unacknowledged chunks to this hotspot in step 825. The hotspot then delivers at least a fraction of the chunks it received to an onboard proxy in step 830. It is then determined if the hotspot completed the delivery in step 835. If the hotspot completed the delivery, the hotspot notifies the gateway in step 850 and the methodology terminates in step 855. If hotspot did not complete the delivery, the hotspot transmits the remaining nondelivered chunks back to the gateway in step 840. The gateway then generates a new response from these undelivered chunks in step 845, before the methodology returns to step 815 where chunks are marked unacknowledged and the methodology repeats.

Figure 9:
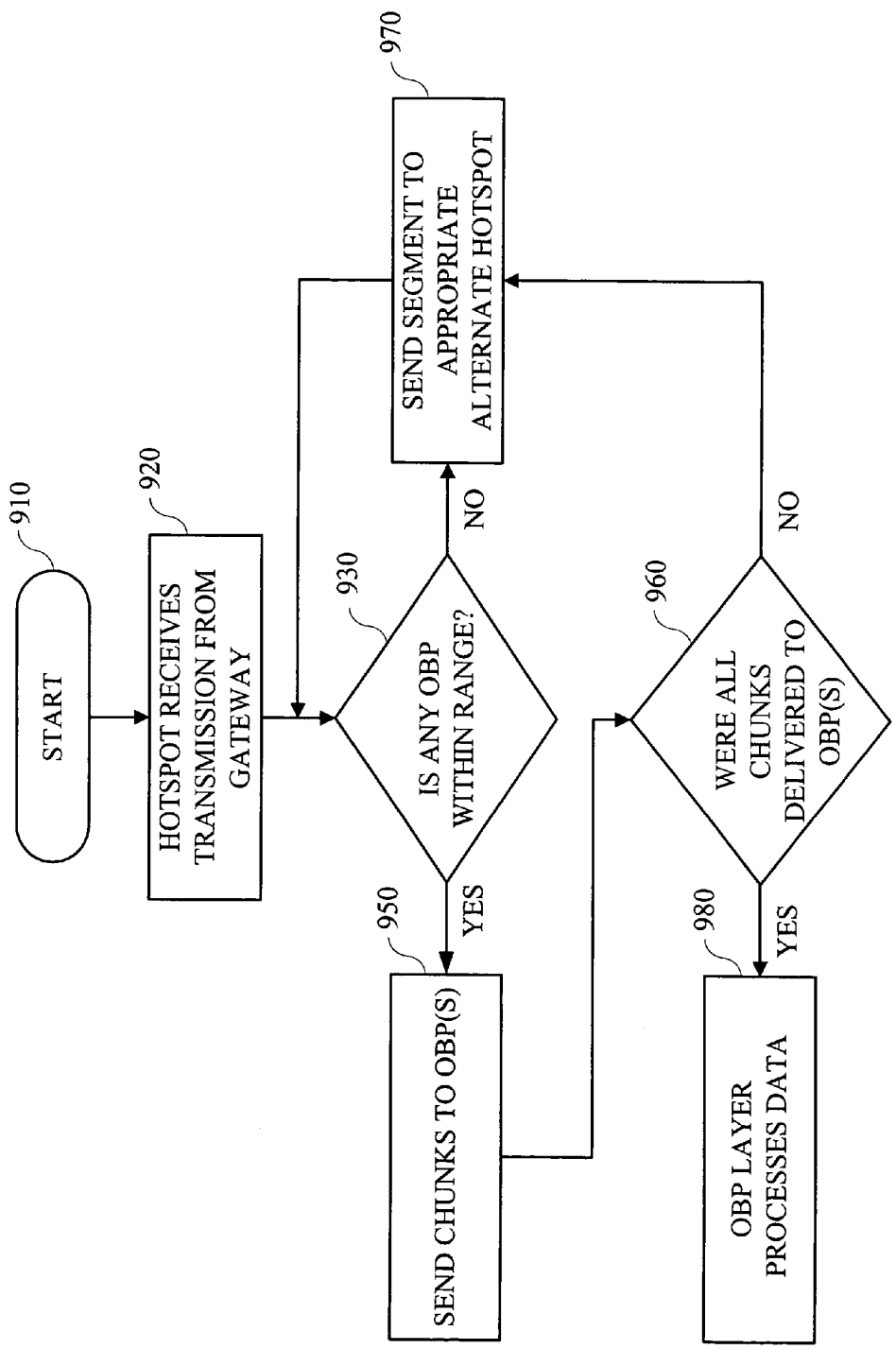
FIG. 9 is a flow diagram illustrating a downstream transmission and recovery methodology within the access point layer, according to an embodiment of the present invention.

Referring now to FIG. 9, a flow diagram illustrates a downstream transmission and recovery methodology within the hotspot layer, according to an embodiment of the present invention. This methodology describes the exchange of information within the hotspot layer 120 of FIG. 1 during downstream communication. Further, the methodology describes data being transmitted downstream from the hotspot layer to the onboard proxy layer. However, the transmission is not completed and the hotspot responds by sending the data to an appropriate alternate hotspot for retransmission. The methodology begins at step 910. A hotspot receives a transmission from the gateway layer in step 920. The hotspot then attempts to locate an OBP within its range in step 930. If an OBP is reachable, the hotspot sends the data chunks to the OBP in step 950 and determines if all of the data chunks were delivered to the OBP in step 960. If all the chunks were delivered, then methodology terminates at the OBP layer in step 980. If all chunks were not delivered to the OBP or an OBP is out of the range of the hotspot, then the data chunk is sent to an appropriate alternate hotspot in step 970 and the methodology returns to step 930 to determine if an OBP is within range of the alternate hotspot.

Figure 10:
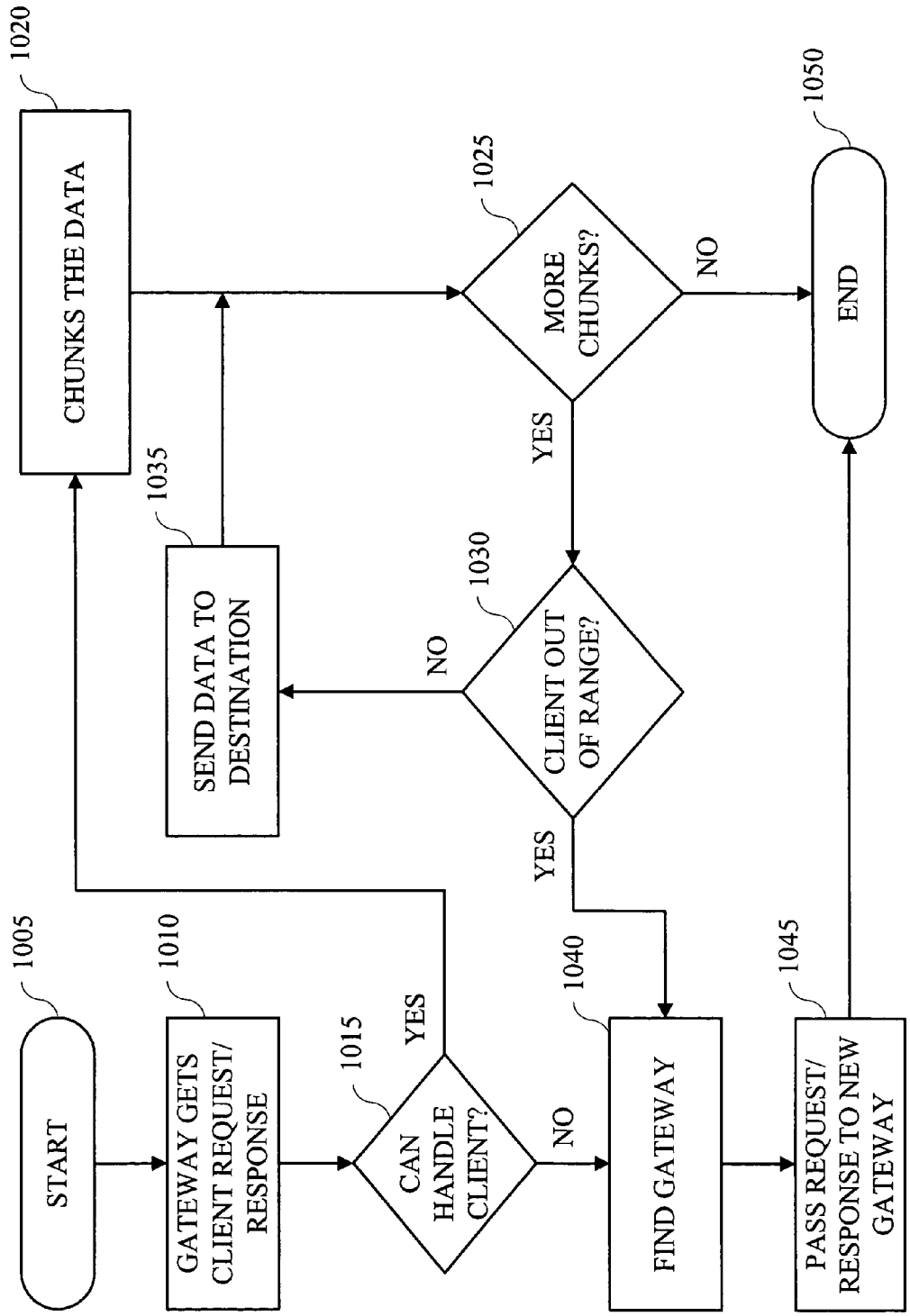
FIG. 10 is a flow diagram illustrating a downstream communication methodology when a client changes gateways, according to an embodiment of the present invention.

Referring now to FIG. 10, a flow diagram illustrates a downstream communication methodology when a client changes gateways, according to an embodiment of the present invention. The methodology describes the exchange of information between multiple gateways. Gateways communicate with one another to ensure that a client moving from one domain to another is transferred to the appropriate gateway accordingly. The method in FIG. 10 begins in step 1005. A gateway receives a client request or response in step 1010. It is then determined whether the gateway has the capabilities to reach this client in step 1015. If the gateway cannot reach this client, the gateway finds another gateway that can reach this client in step 1040 and passes the request/response to the new gateway in step 1045, before terminating the methodology in step 1050. If the gateway can reach this client, the gateway breaks the data into chunks of arbitrary size in step 1020, at which time no chunks have been sent to a desitination. The gateway then determines if any remaining chunks need to be sent to the destination in step 1025. If there are no more chunks, the methodology terminates in step 1050. If there are more chunks not yet processed, it is determined whether the client is out of range in step 1030. This means that the gateway determines whether it still has the capability to reach this client. If the client is out of range, the gateway finds another gateway that can reach this client in step 1040, and passes the request/response to the new gateway in step 1045, before terminating the methodology in step 1050. If the client is still in the gateway's range, it sends the current chunk of data to its destination in step 1035 and the methodology returns to step 1025, where it determines if there are more chunks to transmit.

Figure 11:
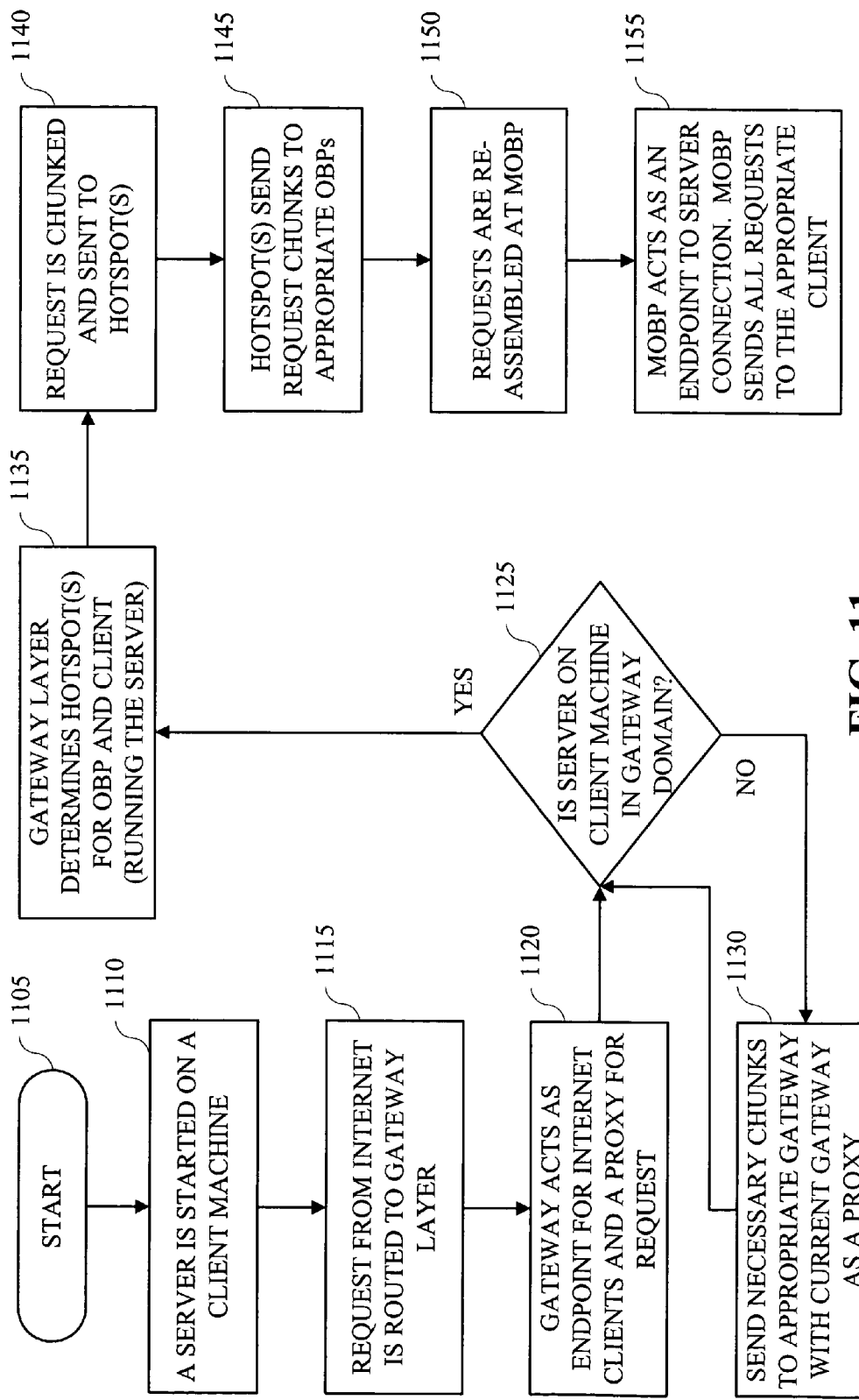
FIG. 11 is a flow diagram illustrating a server communication and onboard proxy information collection and propagation methodology, according to an embodiment of the present invention.

Referring now to FIG. 11, a flow diagram illustrates a server communication and onboard proxy information collection and propagation methodology, according to an embodiment of the present invention. This methodology describes downstream communication in which a server is running on a mobile client and is addressable by the mobile connection spreading system. Preceding the beginning of the methodology in step 1105 is the dynamic addressing relaying mechanism used by the mobile connection spreading system to give trackable addresses to all of the clients in the system, as described in FIG. 3. Once the client has an address, the server may be started on the client machine in step 1110. All of the addresses currently distributed are addressable from the external computing network. Requests for this server are routed from the network to the gateway layer in step 1115. If the addresses were not routeable from the external computing network, the gateway layer could receive all requests as firewalls do, and route them to appropriate servers according to port forwarding rules. The gateway layer acts as an endpoint to the clients so that intermittent periods of no connectivity to the server will not terminate the connection between the client and the server running in the methodology. The second role of the gateway layer in this methodology is to forward the requests (as a proxy would) to the server in step 1120.

In order to forward the requests to the server, the gateway layer must follow similar steps of downstream communication as those defined in FIG. 10. First, the gateway must determine if the machine, on which that server is running, is in its domain in step 1125. This is possible because the gateway can passively track the location of the machine's MOBP during the gateway's other communication with the hotspots as it moves. The gateway layer can easily link the MOBP to particular machine addresses because the gateway administered a range of addresses for disbursement in the dynamic address relaying step. If the gateway determines that the server is out of its domain, or that the server will travel out of its range before the gateway can send the entire request, the gateway sends necessary chunks to the appropriate gateway and serves as a proxy for that gateway's communication in step 1130. If the gateway can send all or part of the request to the server before the server travels out of range, the gateway determines the hotspot or hotspots for the appropriate OBP layer in step 1135. Messages are then broken into chunks and sent to the hotspot(s) in step 1140, which in turn send the chunks to the appropriate OBP layer in step 1145. These chunks are reassembled at the MOBP in step 1150, which serves as the server's endpoint to the client in step 1155, terminating the methodology. The MOBP, acting as the server's endpoint, prevents undesirable behavior when physical connections are broken in times where no hotspot is in range.

Figure 12:
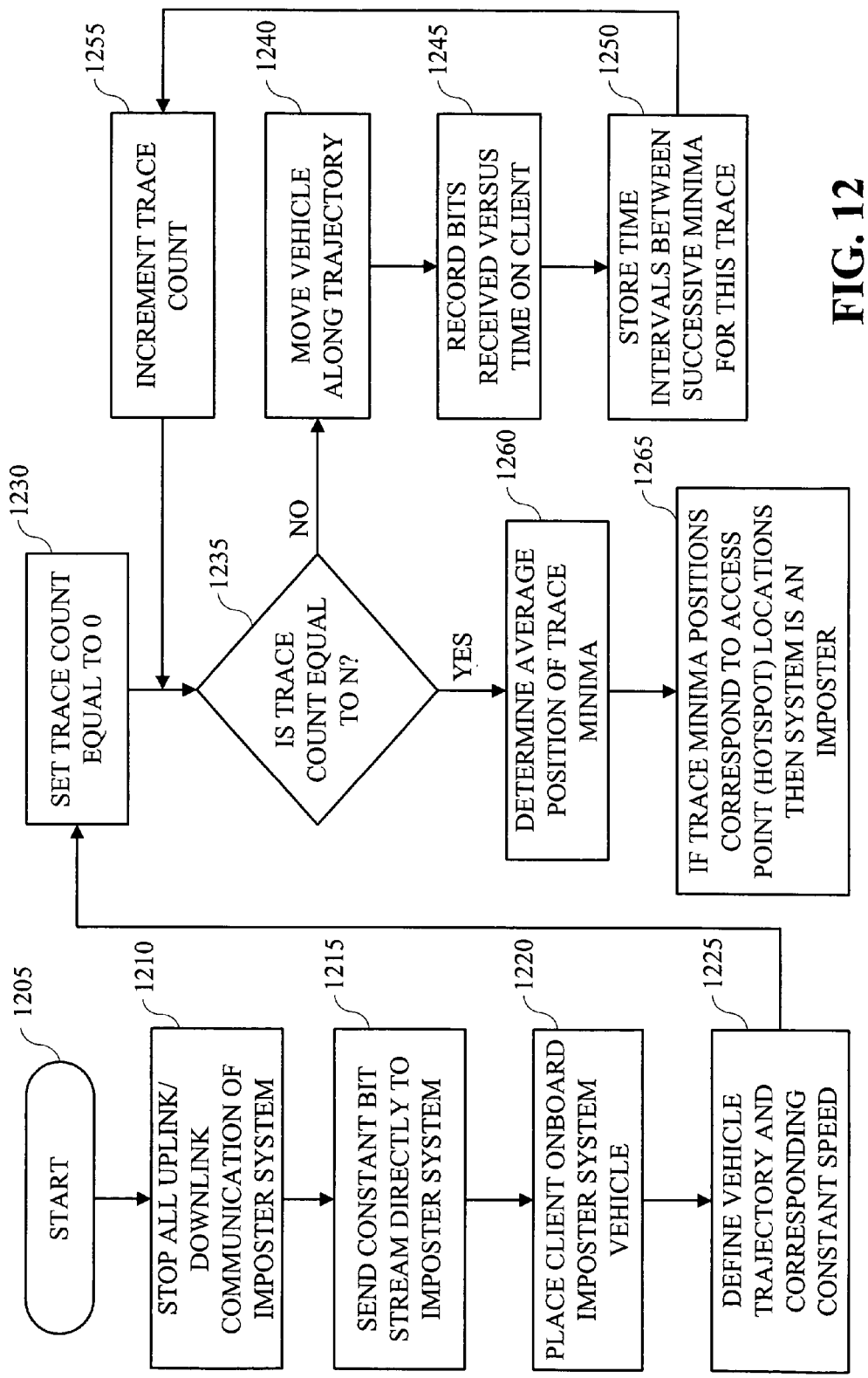
FIG. 12 is a flow diagram illustrating an unauthorized user detection methodology, according to an embodiment of the present invention.

Referring now to FIG. 12, a flow diagram illustrates an unauthorized user detection methodology, according to an embodiment of the present invention. The methodology begins at step 1205. This methodology stops the uplink/downlink communication of the impostor system in step 1210, sends a constant bit stream directly to the impostor system in step 1215, and places a testing client on a vehicle in that system in step 1220. The client then defines the vehicle trajectory and corresponding speed function in step 1225, which could be learned by the client. A trace count is set equal to 0 in step 1230 and it is then determined if the trace count is equal to N in step 1235. If the trace count is not equal to N, as the vehicle moves along the trajectory in step 1240, the test client records the bits received as a function of the time on the client in step 1245. The time interval between successive minima are then recorded in step 1250. The trace count is incremented in step 1255 and the methodology returns to step 1235 to determine if the trace count is equal to N. The client should perform this test over a sufficient distance many times. If the trace count is equal to N, the average position of the function minima is determined in step 1260. The average minima positions are then compared to hotspot locations in step 1265. If a certain percentage of the locations correspond to the average minima, the system can be recognized as an impostor in step 1265, and the methodology terminates.

Figure 13:
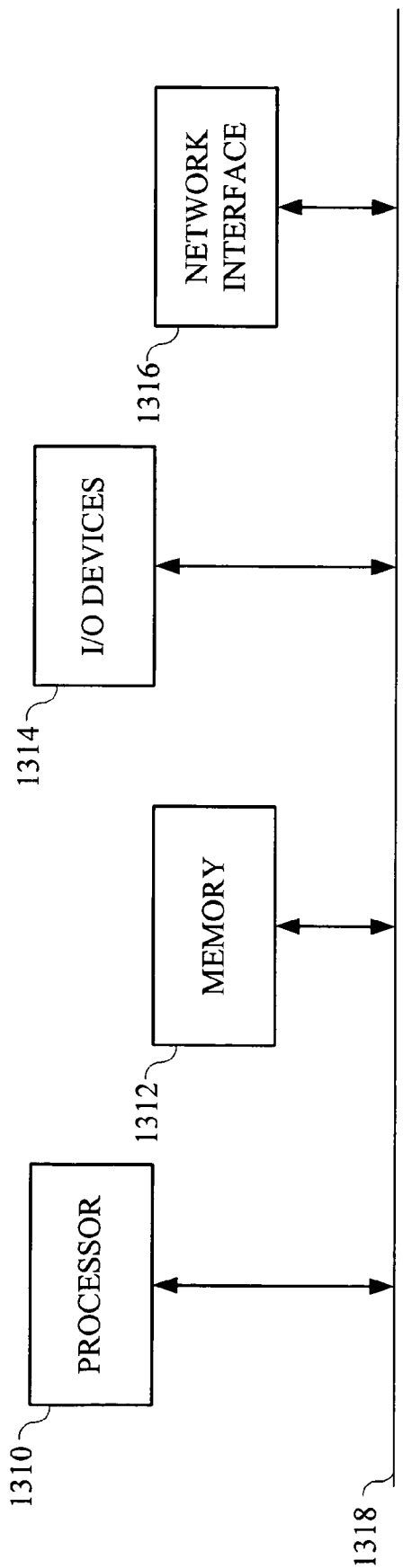
FIG. 13 is a diagram illustrating an illustrative hardware implementation of a computing system in accordance with which one or more components/methodologies of the present invention may be implemented, according to an embodiment of the present invention.

Referring now to FIG. 13, a block diagram illustrates an illustrative hardware implementation of a computing system in accordance with which one or more components/methodologies of the invention (e.g., components/methodologies described in the context of FIGS. 1 through 12) may be implemented, according to an embodiment of the present invention. For instance, such a computing system in FIG. 13 may be gateway 210, hotspot 220, onboard proxy 230 and mobile client 240 of FIG. 2.

As shown, the computer system may be implemented in accordance with a processor 1310, a memory 1312, I/O devices 1314, and a network interface 1316, coupled via a computer bus 1318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol (e.g., HTTP/S).

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Accordingly as described herein, the present invention provides techniques for providing a data transmission system, and more particularly a wireless data transmission system supporting continuous connectivity between a mobile client and an external computing network.

Although illustrative embodiments of the present invention have been described herein with reference to the accompanying drawings, it is to be understood that the invention is not limited to those precise embodiments, and that versions, other changes, and modifications may be made by one skilled in the art without departing from the scope or spirit of the invention.

What is claimed is:

1. A method for processing a message in a wireless communication network comprising the steps of:

receiving at least one portion of the message at a computing device from at least one of a plurality of access points when the at least one access point is in range of a mobile client in the wireless communication network, the computing device comprising a gateway to an external computer network;

merging received portions of the message when two or more portions of the message are received at the gateway; and transmitting a reassembled message, generated from said merged received portions, from the gateway to the external computer network;

wherein the step of merging received portions of the message comprises the steps of:

receiving fewer than all of the portions of the message at the gateway;

waiting a specified time interval for receipt of one or more additional portions of the message at the gateway;

if said one or more additional portions are received at the gateway in the specified interval, merging said one or more additional portions of the message with the previously received portions of the message;

if said one or more additional portions are not received at the gateway in the specified interval, said gateway performing at least one of transmitting an error message to a sending socket and requesting said one or more additional portions from one or more other gateways;

determining when a given additional portion of the message received at the gateway during the specified time interval is a last portion of the message; and reassembling the portions of the message at the gateway after the last portion of the message has been received;

wherein an Internet Protocol (IP) address is established for the mobile client through at least one onboard proxy associated with the mobile client; and wherein one or more of the portions of the message are received at one or more of said access points from the mobile client through said at least one onboard proxy.

* * * * *